F. O'NEILL, Jr.
MACHINE FOR TREATING FLAX AND OTHER FIBROUS PLANTS.
APPLICATION FILED SEPT. 11, 1914. RENEWED OCT. 8, 1920.

1,369,045.

Patented Feb. 22, 1921.
5 SHEETS—SHEET 2.

F. O'NEILL, Jr.
MACHINE FOR TREATING FLAX AND OTHER FIBROUS PLANTS.
APPLICATION FILED SEPT. 11, 1914. RENEWED OCT. 8, 1920.

1,369,045.

Patented Feb. 22, 1921.
5 SHEETS—SHEET 4.

Witnesses
Inventor
Frank O'Neill Jr.
By Chas. J. Williamson
Attorney

UNITED STATES PATENT OFFICE.

FRANK O'NEILL, JR., OF PARIS, KENTUCKY, ASSIGNOR, BY DIRECT AND MESNE ASSIGNMENTS, OF FORTY-NINE ONE-HUNDREDTHS TO HIMSELF AND S. F. B. MORSE, OF NEW YORK, N. Y., AND FIFTY-ONE ONE-HUNDREDTHS TO WILLIAM T. HUGULEY, OF NEW YORK, N. Y., CHARLES L. T. FISHER, OF WASHINGTON, DISTRICT OF COLUMBIA, AND ROBERT P. SHICK, OF PHILADELPHIA, PENNSYLVANIA.

MACHINE FOR TREATING FLAX AND OTHER FIBROUS PLANTS.

1,369,045.  Specification of Letters Patent.  Patented Feb. 22, 1921.

Application filed September 11, 1914, Serial No. 861,261. Renewed October 8, 1920. Serial No. 415,679.

*To all whom it may concern:*

Be it known that I, FRANK O'NEILL, Jr., of Paris, in the county of Bourbon, and in the State of Kentucky, have invented a certain new and useful Improvement in Machines for Treating Flax and other Fibrous Plants, and do hereby declare that the following is a full, clear, and exact description thereof.

My invention relates to the separation from plants of the fibers thereof. My invention may be embodied in machines to deal with plants of great variety, including, for example, manila, banana, flax, ramie, hemp, etc., and the object of my invention, generally stated, is to provide a machine of high efficiency, both in regard to the character and quantity of its product and so sturdy and strong as to be able to withstand, without derangement, the severe usage which work in the field involves, and in the embodiment of my invention in machines for recovering the seeds of plants, such for example, as flax, the production of a machine capable of threshing or separating out the seed during the passage of the plants through the decorticating mechanism and without the employment of special instrumentalities, or mechanism for threshing.

The basic principle upon which I have developed my invention in dealing with the plant structure for the separation of the fiber, is that of the efficient ancient hand and machete method which thoroughly decorticates without any violent or harsh treatment that would endanger the fiber.

To illustrate my invention, I show it in the drawings as embodied in a machine for the decortication of flax, such machine being so constructed and organized as to thresh the seed from the unretted flax straw and to recover the line fiber, separate the short fibers, or tow from the line fiber, shive or woody portions of the stalk, and to deal with tangled masses so as to recover the fiber therefrom.

In the accompanying drawings—

Fig. 5ª is a detail top plan view of adjacent portions of the bars, or sections of the pressure producing device shown in Fig. 5;

Fig. 19ª is a detail view in cross section of two of the radial arms of the centrifugal separator;

The machine shown in the drawing is organized so that it has a frame 10 adapted to be mounted upon carrying wheels 100 so that the machine may be readily transported and used in the field. Said frame may be constructed of I-beams, or channels and it supports a horizontal feed table 11 upon which the plants are placed and spread evenly and thin so that they may be readily passed into a hopper 12 and their root ends caught by a conveyer that consists of a pair of endless belts 13. One of the belts 13 passes over two pulleys or rollers 14, while the other belt 13 passes over two pulleys 15, each contiguous to one of the rollers 14 and over a third pulley, or roller 16, the rollers being arranged so that each belt has upper and lower long horizontal runs with the lower horizontal run of one belt adjacent the upper horizontal run of the other belt and it is between such adjacent horizontal runs that the root portion of the plants is gripped. The belts are ribbed or corrugated longitudinally so that the longitudinal rib on one belt projects into a groove in the opposite belt and thereby the clamped portion of the plant is caught or crimped between opposing ribs and grooves and thus is securely held against longitudinal displacement while being subjected to the action of the decorticating apparatus that exerts a longitudinal pull on the plants in the direction away from the belts. The plant-clamping adjacent portions of the belts are supported by a horizontal track 17 and they are yieldingly pressed toward each other while they clamp the plants by a series of spring-held presser devices in the form of a series of bars 18 placed in alinement with the ends of contiguous bars interlocking by a tongue and groove arrangement so as to provide a practically continuous or uninterrupted bearing surface against the uppermost run of the clamping runs of the two belts, so that pressure is not relaxed at any time on the plants. Each bar, or section 18 is pivotally suspended by parallel levers 19 that are connected by a link 20 to one end of which is attached one end of a spring 21 whose other end is attached to some relatively stationary point so that its tension may be adjusted. The levers 19 incline slightly forward in the direction of travel of the clamp portions of the belts so as to avoid any danger of jamming or clogging.

Figures 5A, 7, 8, 9:
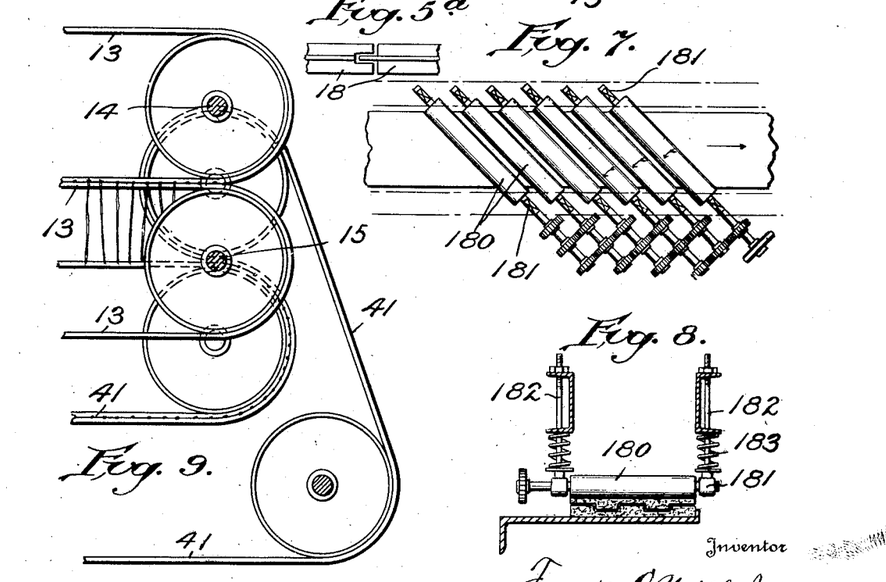
Fig. 7 is a plan view of a portion of another form of pressure-producing device.
Fig. 8 is a detail view in cross section.
Fig. 9 is a detail view illustrating the two plant conveyers at the point of transfer of plants from one to the other.

A different form of pressure-producing means is shown in Figs. 7 and 8, which consists of a series of parallel small rollers 180 extending obliquely across the belt, each roller being journaled at its ends in bearings 181 attached to each at the lower end of a vertically slidable rod 182 around which is placed a coil spring 183 that presses the bearing downward upon the belt. Preferably the rolls are positively driven and for this purpose their shafts are extended and provided with intermeshing pinions by which motion from one roller is transmitted to another, and one of the rollers of the series being geared to a source of power. Alternate rolls are loose upon their shafts, and, hence, receive their motion from their contact with the belt against which they bear, and on the shaft of each of such loose rolls are idler gears, which, revolving in the opposite direction from said loose rolls transmit motion to the next succeeding rolls in the same direction in which the loose rolls are driven by their contact with the traveling belt. By the oblique arrangement of the rollers it will be evident that at no time is the plant between the runs of the belts without a gripping pressure and the oblique arrangement of the rollers, since by their revolution they impart a sidewise tendency to the belt augments the grip on the plants by the sidewise pressure of the edges or sides of the overflapping ribs of the longitudinal corrugations of the belts.

There are two sets of decorticating devices, one of which acts upon the plants for a portion of the length thereof, while the root parts are held by the two belts 13 and the other set subsequently acts upon the portions of the plants inaccessible to the first set by reason of the engagement of the clamping belts therewith, and each of these sets comprises a plurality of opposing coacting softening rolls and scutching or scraper blades. These devices are moved lengthwise of the plants toward the free ends thereof, their action beginning first at or near the free ends and continuing progressively away therefrom toward the clamped or held portions of the plants. After the action of one set of softening and scutching devices the grip of the conveyer belts 13 is released from the root or end portions of the plants and the seed or other end portions of the plants (having been first denuded of the seed and decorticated) are clamped by the adjacent runs of similar belts.

Each set of softening rolls and scutching blades consists of two series of softening rollers 23 and scutching blades 24, respectively, mounted upon endless chains or carriers 25 and 26, the chains 25 passing over proper wheels 27 on shafts 28 and the chains 26 passing over proper wheels 29 on shafts 30 so that there are horizontal runs of the chains 25 and 26 that are parallel and which bring softening rollers 23 in opposing pairs and scutching blades 24 in opposing pairs. Each roll 23 is journaled in arms 31 that are hinged or pivoted to brackets 32 that are riveted to the sprocket chains 25 or 26, as the case may be, and so that the upper one of a pair of opposing rolls may have a limited swinging motion toward the other to automatically compensate for different thicknesses of straw or stalks and always exert a proper feeding pressure thereon and each scutching blade 24 is fixed to an arm 33 which is hinged to a bracket 34 likewise riveted, or fixed to the sprocket chains so that a pair of opposing scutching blades may have a limited movement toward and from each other. The blade carrying arms 33 are provided with antifriction rollers 35, which, by travel of the arms with their chains encounter rails 36 having inclined surfaces 37 which acting upon the rollers swing the opposing blades toward each other to cause them to bite upon, or against the plants passing between them and a pair of coöperating blades is so disposed that the edge of one blade is slightly in advance of the edge of the other and in a plane to one side of a horizontal plane passing through the points of contact of the softening rollers 23, the result of this arrangement being that the stalk of the plant is abruptly bent between the two blades and after emerging from between them passes at an inclination to the point where the rollers engage it so that such a sharp or abrupt bend is given the stalk as to result in the fracture of the woody portion of the stalk and its protrusion from the fibers so that the scraping effect of the blades upon it becomes highly efficacious. The pair of scutching blades at one side of a pair of softening rolls has its edges where the stalk emerges between them situated in a plane higher than a horizontal plane passing through the point of contact of the rolls while the pair of scutching blades on the other side where the stalk emerges from between them is situated below such plane passing horizontally through the point of contact of the rolls so that the upper and lower sides of the stalk alternately are subjected to the maximum bending. The formation of the edges of the scutching blades will vary to suit different kinds of vegetable growth or plants.

It is desirable to avoid a too abrupt, or harsh bending of the straw because of the danger of breaking, or injuring the line fiber. I avoid this, while at the same time bending the straw to the sharp degree that is important to effect the fracture of the woody portions by making the bend a gradual process which I accomplish by such arrangement and adjustment of the scutcher blades, as is illustrated in Figs. 10 to 14 of the drawings.

Figures 14, 15:
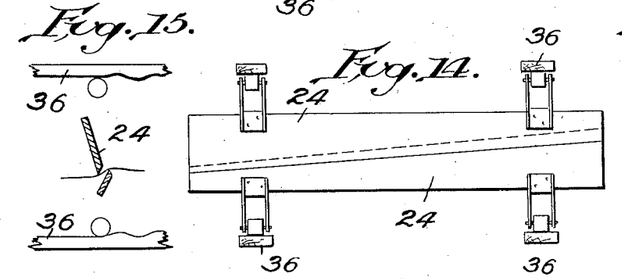
Fig. 14 is a side elevation of the first sections of a pair of opposing blades.
Fig. 15 is an end elevation of said blade section looking at the receiving, or plant-entering end.
Figure 16:
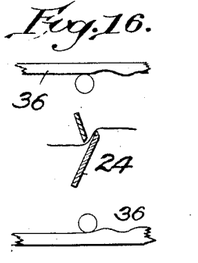
Fig. 16 is a detail view looking at the opposite ends of said blade sections.

As shown in Figs. 14, 15 and 16, the first acting blade sections of two opposing, or coöperating series of scutchers have their working edges diverging in the direction of sidewise travel of the straw between the blades so that said working edges overlap, or extend beyond each other progressively from the point of entrance of the straw between them. Thus, a very slight bend of the straw is produced where it first enters between said blade sections (as illustrated in Fig. 15) which gradually becomes more abrupt until the angle is quite acute (as shown in Fig. 16) when the straw passes from said first acting blades to the next in the series. Thus, though finally the sharp, or acute bend which is important is secured, it is accomplished so gradually that injury to the fiber is prevented.

Figure 10:
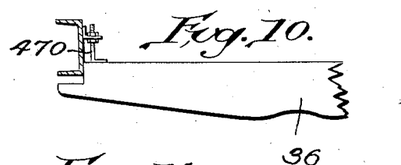
Fig. 10 is a detail view illustrating means for varying, or adjusting the extent of approach of a pair of scutcher blades to each other.
Figure 11:
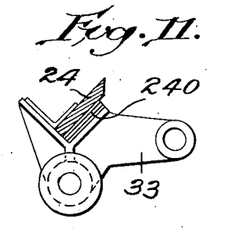
Fig. 11 is a detail view illustrating means for adjusting each individual blade to determine the distance apart of coöperating blades.

To the same end, namely, that of the application of pressure to the stock so as to secure decortication without injury to the fiber, means for adjusting the scutcher blades so as to place their working edges in the most advantageous position, are necessary. The necessary adjustments involve the spacing of the working edge of opposing blades in the direction of the length of the plants and in a direction crosswise thereof. Obviously the less distance between such edges in the direction of the length of the plant and the greater distance between the planes occupied by such edges in a direction crosswise of the length of the plant, the sharper the bend of the plant and changes in, or adjustment of these distances modifies the angle of the bend. As illustrated in Fig. 10, the spacing of the working edges of the blades in a direction crosswise of the plants is changeable, or adjustable by mounting the guide bars 36 upon adjustable brackets, or supports 470. For changing the spacing between the working edges in the direction of the length of the plants the arrangement illustrated in Figs. 12 and 13 may be used. The sprocket wheel shafts of adjacent chains are geared together by a gear 261 fixed on one shaft and a gear 262 loose on the other shaft upon which shaft is secured a collar 263 having a screw 264, one end of which is in the path of a lug 265, projecting from the side of the gear 262. By adjusting the screw 264, so as to change the point in the rotation of the gear 262, where the lug 265 will strike the screw, the chain which receives motion from said gear 262 can be moved without movement of the chain connected with the gear 261, and hence, the distance between the working edges of the scutcher blades in the direction of travel thereof along the length of the stalks can be adjusted.

Figures 12, 13, 19A:
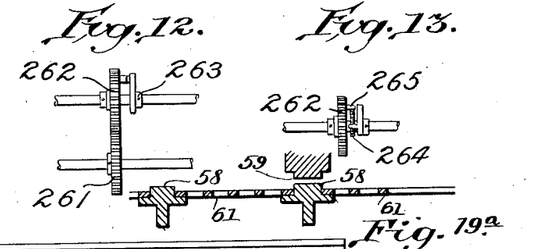
Figs. 12 and 13 are detail views of means for adjusting the distance between opposing blades in the direction of travel of the blades lengthwise of the plants.

In each of Figs. 10, 12 and 13, the one adjustment controls all of the scutcher blades. It is desirable to provide for individual adjustment of the scutcher blades. For that purpose, the arrangement illustrated in Fig. 11 may be employed which consists simply of liners, or shims 240, placed back of the scutcher blades.

Figure 17:
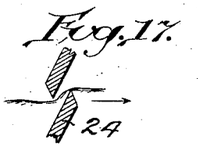
Figs. 17 and 18 are detail views illustrating the effect of different adjustments of the working edges of the scutcher blades.
Figure 18:
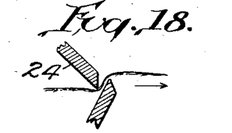

In Figs. 17 and 18 the effect of changing the spacing between the working edges of opposing scutcher blades, is illustrated, Fig. 17 showing such relation as gives initially a very slight bend and Fig. 18 one that gives a sharp bend to the plant.

It is highly important that the plant between a pair of scutching blades and a pair of softening rollers 23 should not be drawn tight, but it must be in a loose, or relaxed condition in order to cause the protrusion beyond the fibers of the internal woody, or husk portions when broken to bring about the efficient scraping action of the scutching blades. I produce this desirable condition by imparting rotation to the softening rollers 23 in a direction and at a peripheral speed that causes them to feed or move the plants from them toward the scutching blades. A simple way of causing such revolution of the rollers is to provide a pinion 38 on the end of the lower roller and a stationary rack 39 with which the pinion meshes so that as the roller moves along in its travel with the chains the rack will cause the revolution of the pinion and of the roller. For the treatment of flax, the surfaces of the rollers 23 that engages the stalk are smooth and the function of these rollers is merely to crush or break down the woody material and thereby loosen the fiber, but without breaking the woody material into short lengths, for that function is performed by the scutching blades.

The scutcher blades incline upward and rearward from the straw, with reference to the direction of travel of the blades over the straw.

Besides their movement lengthwise of the stalks or plants, the scutching blades 34 have a movement crosswise thereof, which movement is brought about by providing the guide rails 37 with an undulating, or wave-like cam surface 40 over which the rollers 35 ride and these undulatory surfaces are so arranged that a pair of scutching blades vibrates in unison so that their proper coöperating position with reference to the plant is at all times maintained. It will thus be seen that not only do the scutching blades act by bending and scraping, but by a vibratory movement crosswise of the length of the plants they tend to loosen and separate the fiber and the woody portions of the stalk.

While the scutching blades are acting upon the plants lengthwise of the latter, the plants are being carried along in a direction crosswise of their lengths by the action of the conveyer belt 13, and in order to secure the progressive treatment of the plants from one end thereof toward the center, I provide a series of scutcher blades 34 of a total length equal to the distance traveled by the plants when moving with the carrier belts 13 and bringing the various sections of a blade successively into action by such disposition of the inclined portions of the cam bars 37 as will accomplish that result. This means merely having one or more cam bars 37 for each blade section and setting the inclined portions thereof at the desired points successively along the line of travel of the blades with their carrying chains.

Until the inclined portions of the cam bars 37 act upon the rollers 35, an opposing pair of scutcher blades are sufficiently far apart not to touch the plants, but as soon as the rollers encounter the inclines then the blades approach each other with the result that the blades that first act upon the plants by their gradual approach toward each other encounter the seeds and detach the same from the plants so that the seeding operation takes place during the approach of the scutcher blades to the point where one has its advancing edge projected beyond the corresponding edge of the other and gives to the straw the sharp bend that breaks the woody material of the straw.

After passing from between the adjacent runs of the chains 25 and 26 the free ends of the fiber completely decorticated are caught and clamped between adjacent runs of two belts 41, corresponding to the two belts 13 and the as yet undecorticated portions of the plant are presented thereby to the action of the softening rollers 23 and the scutching blades 24 on the lower run of the chains 26 and similar softening rollers 42 and scutching blades 43 on endless chains 44 which are supported by wheels 45 on the shafts 46, cam bars 47 being provided to control the positions and movements of the scutching blades 43. It will thus be seen that I make the chain 26 and the softening rollers and scutching blades thereof coöperate with each of two similar mechanisms and thus provide a simplified and compact structure.

The fiber completely decorticated and having the seed completely removed (if the plants dealt with carry seed) the seed being removed or threshed by the action of the first acting pair of scutcher blades, is delivered as line fiber from between the belts 41 to a trough or collector 48.

The seed, short fibers and shive are discharged from the decorticating mechanisms are carried by a slatted apron 49ª to a belt conveyer 49 by which they are delivered to a centrifugal separator 50 by which the fiber in the form of tow is separated from the seed and woody portions, the fiber being discharged therefrom at the outlet 51 while the seed and shives are discharged from the centrifugal separator by a spout 52 that delivers them to a reciprocating screen and pan 53 from which the seed and light chaff are delivered to a slatted, or skeleton conveyer 54 while the shives are discharged to an endless conveyer 55 by which they are removed to some convenient point. The seed and chaff falling between the slats of the skeleton conveyer 54 come opposite the inlet end of an air trunk or flue 561 leading to a rotary fan 560 mounted on the shaft of the centrifugal separator by which the light chaff is separated from the seed so that the seed is finally delivered from the machine in a cleaned condition by the skeleton conveyer, which moves it over a supporting table 540.

Figure 19:
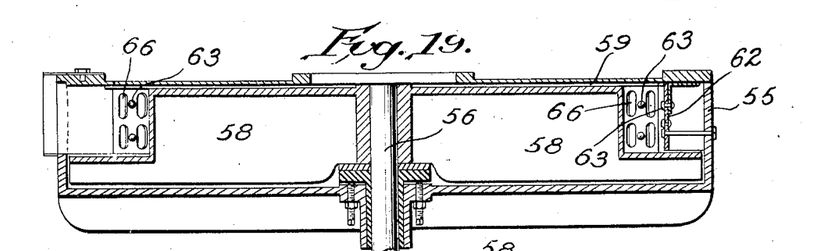
Fig. 19 is a vertical central section through the centrifugal separator.
Figures 20, 21:
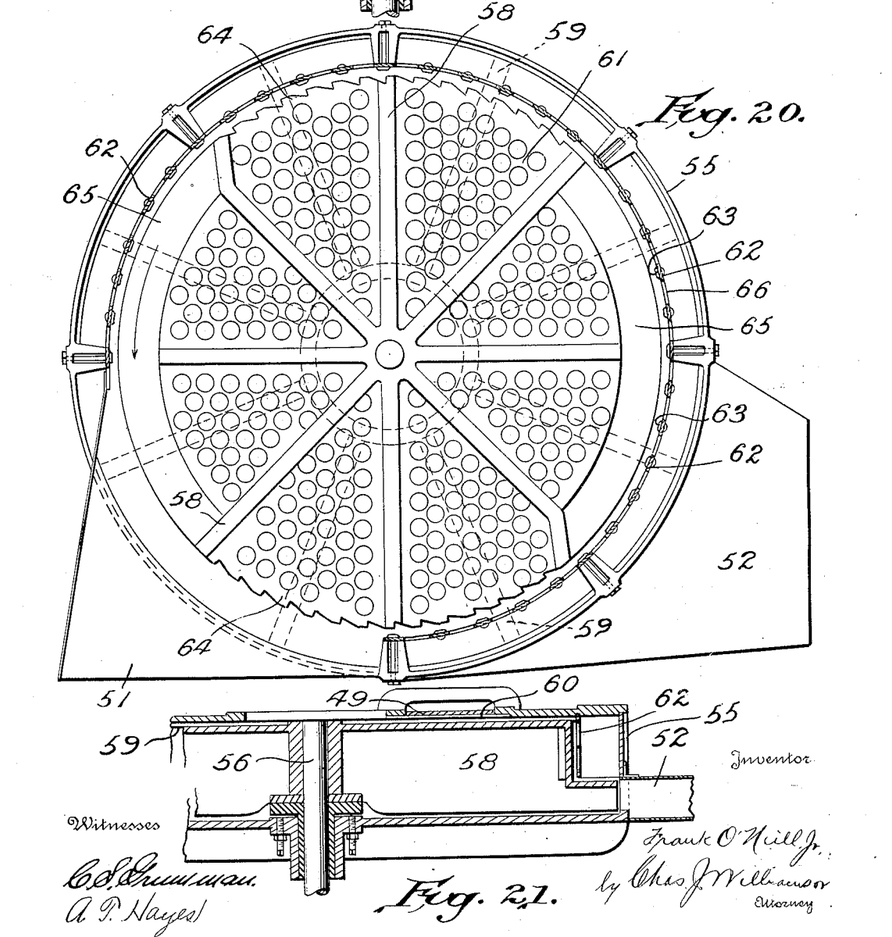
Fig. 20 is a top plan view thereof with the top or cover removed and the circular grinding wheel and screen in horizontal section.
Fig. 21 is a vertical section of said separator on a plane passing through the seed and shives discharging spout, a portion of the separator being broken away.
Figure 22:
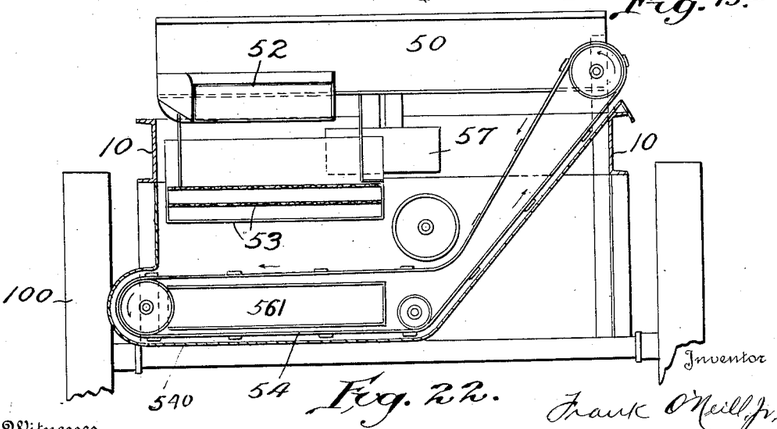
Fig. 22 is an end elevation of the machine with parts in section.

The centrifugal separator 50, has preferably, but not necessarily, the details of construction illustrated in Figs. 19 to 21. It comprises a cylindrical vertical shell, or housing 55 having a closed bottom and a top that is closed, except for certain necessary openings, which housing is mounted upon the machine frame. Upon a central vertical shaft 56 passing through the housing and having a band wheel 57 beneath it for belting to a suitable source of power, is the rotating member that comprises a series of radial arms 58, which, at their tops lie adjacent to radial arms 59 on the underside of the top of the housing, the two series of arms, one stationary and the other revolving forming softening or scutching devices which act upon the stock delivered through the opening 60 in said top from the belt conveyer 49 softening and breaking up in short lengths the woody husk. In the spaces between the rotating radiating arms are placed segment shape perforated plates 61 that thus form a rotating screen through which broken husk, or shives and the seed may pass into the bottom of the housing and be discharged therefrom into the spout 52 by which they are delivered to the reciprocating screen 53. Within the housing there is a vertical wall 62 that is curved concentric with the rotating member and lies close to the periphery thereof upon the inner surface of which are numerous small protuberances, or projections 63 in contact with which the stock at the periphery of the rotating member is carried as the latter revolves, thus breaking up the husk and softening the fiber, and in order to contribute to this effect the periphery of the rotating member, preferably at intervals, is provided with saw-teeth-like projections 64. The intervals between the groups of projections 64 are provided with circumferentially extending narrow chambers 65 adapted to receive quantities of stock, which, by the action of the protuberances 63, as the stock revolves with the rotating member causes the tumbling about of the mass of stock within such chambers and conduces to the breaking up of the woody husk and the softening of the fiber without injury to the latter. The vertical wall 62 is provided with holes or slots 66 which make of said wall a vertical screen which permits the outward passage of the shives and seed while preventing the escape of the fiber so that the shives and seed thus screened are finally delivered to the spout 52 while the cleaned fiber in the form of tow passes into the outlet 51 at the sides of which the vertical screen 62 terminates to permit the discharge of the fiber from within the screen. The radial arms 58 of the rotating member extend beneath the bottoms of the chambers 65 and beneath the vertical screen 62 so that they engage and act upon the shives and seed which pass through the screen 62 and by centrifugal force expel the same into the spout 52. The tow delivered from the centrifugal decorticator and separator is, of course, in the tangled condition of wool, or cotton, and it may be carded to place it in condition for spinning, or put to such other uses for which it may be fitted.

The rollers 14 and 15 over which the conveyer belts 13 pass at the hopper are reduced in diameter at one end for a distance corresponding to the seed-carrying portions of the plant so that the seed in passing between said rollers will not be crushed or otherwise injured although being subjected to a slight squeezing pressure which breaks open or crushes the seed balls. The end portions of the softening rollers 23 of the first decorticating mechanism in contact with which the seed may come, are also reduced in diameter for the like purpose of preventing injury to the seed.

Figure 1:
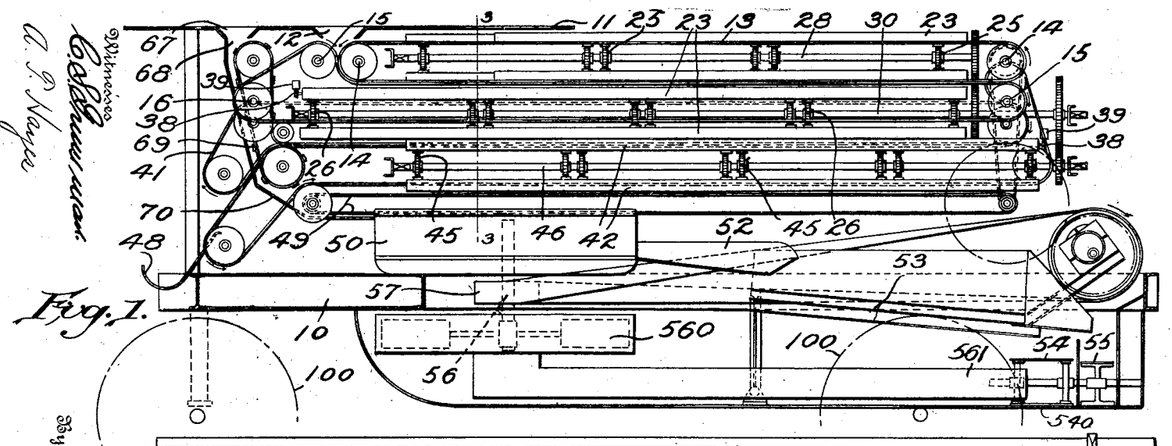
Figure 1 is a side elevation, somewhat diagrammatic of a flax decorticating machine embodying my invention.
Figure 2:
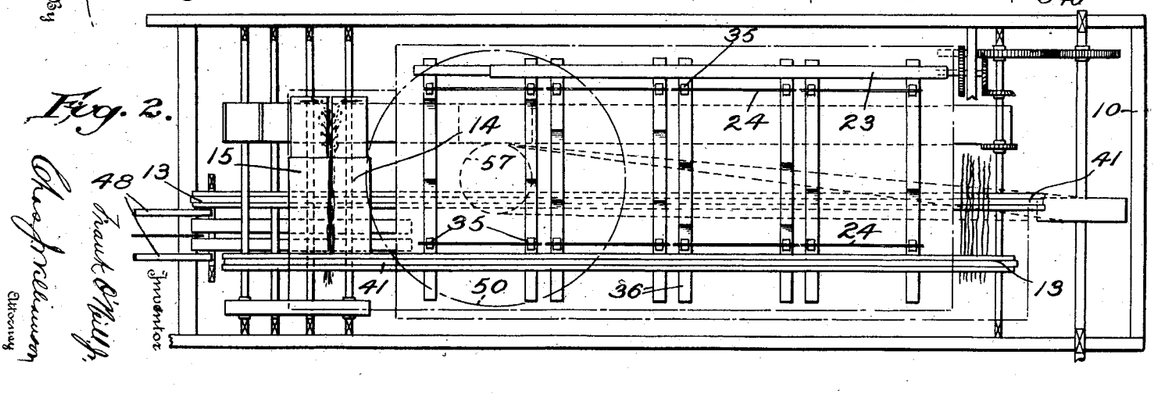
Fig. 2 is a top plan view thereof with the feed table removed.
Figure 3:
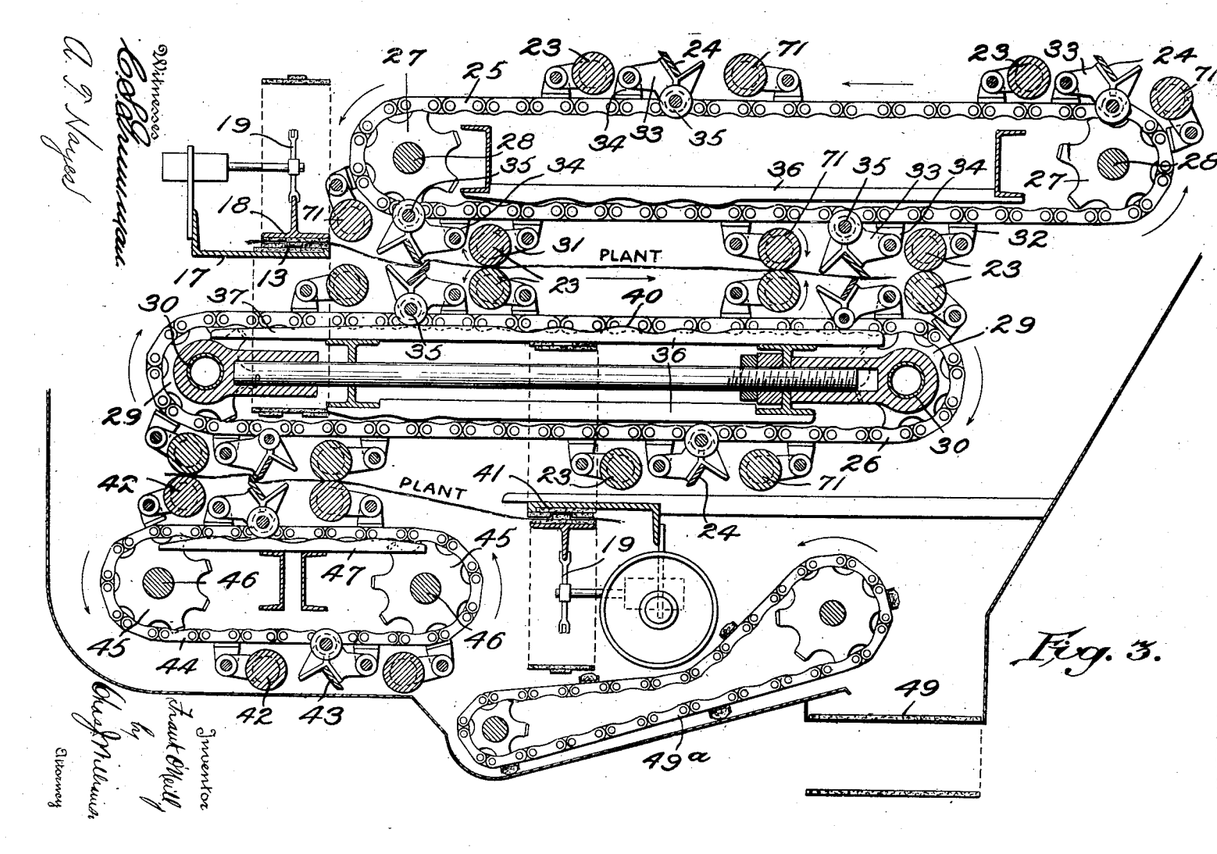
Fig. 3 is a vertical section of the decorticating portion of the machine on the line 3—3 of Fig. 1.
Figures 4, 5, 6:
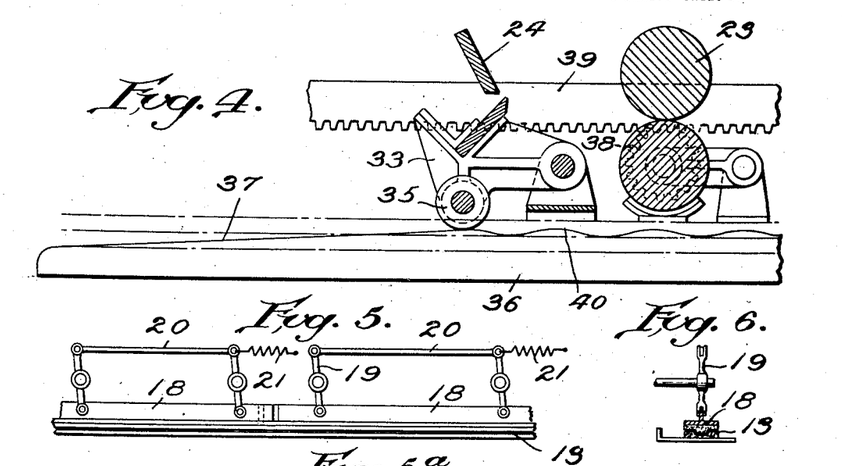
Fig. 4 is a detail view of a pair of softening rolls and scutcher blades of the decorticating mechanism, partly in section and partly in side elevation.
Fig. 5 is a detail view in side elevation of one form of pressure-producing device for the plant conveyer.
Fig. 6 is a cross section thereof.

By reference to Fig. 1, it will be observed that the intermediate member of the decorticating mechanism is offset or projected at the feed end of the machine beyond the upper member and that at the plant-transfer end of the machine the lowermost decorticating member is offset, or projected beyond the adjacent intermediate member and that the feed belts in both cases are situated above, or adjacent the offset portion. This arrangement greatly simplifies the feeding mechanism because the free portion of the plants held by the conveyer belts at these two points in the machine rest upon the offset, or projecting portions of the softening rollers, which thereby in effect become a part of the plant-feeding mechanism.

Just in advance of the hopper 12 the feed table has an opening 67 too small for the passage of plants of normal length and in a separated condition, which leads to a hopper 68 for receiving tangled straw or stock, which on being passed into said hopper is taken by an endless slatted apron 69 and carried thereby to the conveyer 49 which delivers it to the centrifugal separator 50 by which the separation of the fiber in the form of tow, and the seed and chaff are effected. The slatted apron 69 discharges to a table 70 over which the lower run of the conveyer 49 passes on its way to the opening 60 in the top of the centrifugal separator and over which the material delivered to the conveyer 49 is carried by the latter to said opening. The conveyer 49 may be of stitched canvas to provide a rough surface to carry along the material, or it may be provided with slats. The material which may consist of tangled and short stuff and long straws, is placed upon the feed table and pushed along thereover passing first over the small opening 67 into which any tangled and short stuff too small to pass thereover will fall, and then by a continued movement of the remainder the latter is delivered to the larger opening. Sometimes in the field operation of the machine there may be only the short and tangled stuff left, and in that event it is delivered directly into the small hopper 67. If any short stuff finds its way into the larger hopper, obviously the first effect of the scutchers thereon is to pull out the short stuff which will thereupon fall into the apron, or conveyer that delivers it to the centrifugal separator and decorticator.

Rolls 71 similar to the softening rolls may be mounted upon the chains 25 and 26 to coöperate in pairs on the stock on the sides of the scutcher blades opposite the softening rolls 23 for the purpose of resisting the pull on the stock against the grip of the conveyer belts, this effect being obtained by imparting a revolution of the rolls 71 in opposition to the direction of travel of the scutching blades, such revolution being produced by a pinion and rack arrangement similar to that employed for revolving the rolls 23 and the rate of revolution giving a peripheral speed just enough to answer the purpose.

Only a brief description of the operation of the machine shown, is necessary. The plants are placed upon the feeding table and spread out, or scattered thin, and even, with the root end of the straw placed so that it will enter between the feed belts 13 with the seed ends passing between the reduced portions of the belt rollers 14 at the inlet end of the machine. The straw as it passes along with the belts 13 has the seed balls crushed by the action of said rollers 14 thereby facilitating the subsequent action of the scutcher blades to which the seed portion of the straw are presented for the removal of the seed, in the most efficient manner by said blades. Continuing along with the belts 13, the straw is subjected to the softening action of the rolls 23 and then to the bending and scraping action of the scutcher blades, the straw being progressively acted upon from the seed end to a given point beyond the longitudinal center of the straw. The limit of travel with the belts 13 being reached, the root portion of the straw passes from between said belts and simultaneously the decorticated opposite end of the straw is caught by the conveyer formed by the lower belts 41 which feed the partially decorticated straw in the opposite direction for the action of the other set of softening and scutching devices which operate upon the undecorticated portions of the straw working thereon progressively from the end to, or slightly beyond the point where the first decorticating mechanism completes its operation and from the second conveyer formed by the belts 41, line fiber is delivered while the remainder of the material, consisting of shives, seed and tow, passes to the centrifugal separator for further treatment and final delivery from the machine in a separated condition. An important feature of my invention is the manipulation of the straw while passing through the decorticating mechanism by which it is alternately bent in opposite directions while in different planes, for thereby the treatment is highly efficient, but mild and free from danger in injuring the fiber. It will be seen that the flattening of the straw preliminary to bending and scraping it, as for example by the squeezing action of the feed rollers, results in placing the straw in a condition which avoids breaking of the line fiber and facilitates the subsequent removal of the woody portion of the straw. Thus the operation on the straw is first its flattening and then a sliding and crushing action that results in the gentle fracture of the woody portion of the straw without injury to the line fiber, and then its separation from the line fiber. Should the straw be abruptly bent in its round, or unflattened state, injury to the line fiber and resulting tow is unavoidable.

As will be evident, changes in details of construction and organization of the various parts of the machine illustrated as embodying my invention may be made without departure from the spirit, or principle of my invention, and some elements or members may be altogether omitted, or used in other relations. It is, therefore, to be understood that the machine shown in the drawings is but one of many embodiments of my invention.

Having thus described my invention what I claim is—

1. In a machine of the class described, the combination of scutchers extending in a series in the direction of the length of the plants, the respective scutchers consisting of independent sections mounted for independent movement toward and from the plants, and means for bringing the scutcher sections into effective operation upon the plants progressively in the direction in which the series extend.

2. In a machine of the class described, the combination of scutchers extending in a series in the direction of the length of the plants, the respective scutchers of the series, consisting of independent sections mounted for independent movement toward and from the plants, and such sections situated side by side in the direction crosswise of the plants, and means for bringing the respective scutcher sections into effective operation upon the plants.

3. In a machine of the class described, the combination of scutchers extending in a series in the direction of the length of the plants, the respective scutchers of the series, consisting of independent sections mounted for independent movement toward and from the plants, and such sections situated side by side in the direction crosswise of the plants, means for bringing the respective scutcher sections into effective operation upon the plants, plant holding means, and means to move the scutchers lengthwise of the plants.

4. In a machine of the class described, the combination of a holder for the plants, scutchers that slide lengthwise of the plants, and spaced apart in the direction of the length of the plants, and means for producing a slack condition of the plants intermediate the scutchers.

5. In a machine of the class described, the combination of a conveyer which engages the plants for a portion of their length, three endless series of scutchers placed alongside of each other, and a second plant-engaging conveyer, one of said conveyers presenting the plants to the action of opposing scutchers of the two series running in the same direction, and the other conveyer presenting plants to the action of opposing scutchers running in the opposite direction.

6. In a machine of the class described, the combination of a holder adapted to engage the plants for a portion of their length, opposing series of scutchers connected together in two traveling endless series, plant-engaging rolls alternating with the scutchers in each series, and means for slacking the portion of the plants between a pair of scutchers and a pair of rolls.

7. In a machine of the class described, the combination of a holder adapted to engage the plants for a portion of their length, opposing series of scutchers connected together in two traveling endless series, plant-engaging rolls alternating with the scutchers in each series, and means for revolving said rolls in a direction that moves the portion of the plants between them and a pair of scutchers in the direction toward the latter, whereby such portion of the plants is slacked.

8. In a machine of the class described, the combination of a holder adapted to engage the plants for a portion of their length, opposing series of scutchers connected together in two traveling endless series and movable crosswise of their direction of travel, and means to vibrate opposing scutchers as they travel along.

9. In a machine of the class described, the combination of a holder adapted to engage the plants for a portion of their length, opposing series of scutchers connected together in two traveling endless series and movable crosswise of their direction of travel, and means to vibrate opposing scutchers as they travel along, comprising opposite scutcher-actuating cam tracks.

10. In a machine of the class described, the combination of decorticating mechanism, a separator to which the product of the decorticating mechanism is delivered, and means for delivering stock directly to said separator independently of the decorticating mechanism.

11. In a machine of the class described, the combination of decorticating mechanism, a combined decorticator and separator comprising a housing, and a rotary member within the housing; said rotary member having stock-engaging arms, and said housing having stock-engaging arms, and a curvilinear screen with which the periphery of said rotary member coacts.

12. In a machine of the class described, a decorticating mechanism comprising opposing pairs of traveling scutcher blades having stock engaging edges which are in different planes and an intermediate stock-engaging surface situated between said planes whereby the stock is alternately bent in opposite directions.

13. In a machine of the class described, a scutching mechanism comprising two traveling series of opposing blades and opposing rollers, the pairs of blades on opposite sides of a pair of rollers having their stock-engaging edges in planes respectively on opposite sides of the plane of the point of contact of the rollers.

14. In a machine of the class described, the combination of a conveyer which engages the plants for a portion of their length, scutchers extending in a series of independent movable sections in the direction of travel of the plants with the conveyer, the first series of said scutchers provided with inclined operating edges inclined in the direction of travel of the plants with the conveyer.

15. In a machine of the class described, the combination of a conveyer which engages the plants for a portion of their length, scutchers extending in a series of independent movable sections in the direction of travel of the plants with the conveyer, and means for adjusting the horizontal and vertical positions or spacings of said scutchers independently.

16. In a machine of the class described, the combination of a plant holder, opposing pairs of scutcher blades, and means to adjust the distance between the working parts of said blades both lengthwise and crosswise of the plants.

17. In a machine of the class described, the combination of a holder adapted to engage the plants for a portion of their length, and a series of alining disconnected pressure members acting upon said holder, the ends of adjacent members interlocking by a tongue and groove formation.

18. In a machine of the class described, the combination of a decorticating mechanism, a combined decorticator and separator comprising a housing, a rotary member within the housing, said rotary member having stock-engaging arms, said housing having stock-engaging arms, and a horizontal screen placed between the stock-engaging arms, near the top working edges of said arms.

19. In a machine of the class described, the combination of a decorticating mechanism, a combined decorticator and separator comprising a housing, a rotary member within the housing, said rotary member having stock-engaging arms, and a screen placed between said arms near their working edges, said housing provided with stock-engaging arms, and a curvilinear screen with which the periphery of said rotary member coacts, said curvilinear screen provided with protuberances coacting with the periphery of said rotating member.

20. In a machine of the class described, the combination of decorticating mechanisms, a rotary separator and decorticator, and a vibrating screen receiving material from said rotary separator.

21. In a machine of the class described, the combination of decorticating mechanisms, a rotary separator and decorticator, a vibrating screen, and pan receiving material from said rotary member, a skeleton conveyer receiving material from said vibrating pan and screen, means for operating said screen and pan, and a suction device having an inlet end adjacent said skeleton conveyer to separate the dust and light chaff from the seed delivered to said skeleton conveyer.

22. In a machine of the class described, the combination of decorticating mechanisms, a rotary separator and decorticator, a vibrating screen and pan, a suction device and skeleton conveyer acting upon material from said pan and screen, a belt conveyer receiving material from the latter, and means for delivering the woody portions of the plants from the machine separate from the seed.

23. In a machine of the class described, the combination of decorticating mechanisms, an initial feeding and softening mechanism, consisting of sets of opposed pressure rollers, the rollers of one set being offset longitudinally of an adjacent set, and conveyer belts passing over the offset portions of said rollers.

24. In a machine of the class described, the combination of a conveyer which engages the plants for a portion of their length, decorticating mechanisms comprising scutcher blades and roller softening members, portions of the roller members having a smaller diameter to crush the seed balls without injuring the seed, and means to remove the seed.

25. In a machine of the class described, the combination of plant-holding means, opposing scutcher blades having their operating edges diverging from each other in a direction crosswise of the length of the plants, and means to cause said edges to act progressively along the length of the plant.

In testimony that I claim the foregoing I have hereunto set my hand.

FRANK O'NEILL, Jr.

Witnesses:
S. R. NORMAN,
W. T. HUGULEY.